United States Patent

[11] 3,594,744

[72] Inventor Paul W. Caulier
Greenwood, Va.
[21] Appl. No. 813,163
[22] Filed Apr. 3, 1969
[45] Patented July 20, 1971
[73] Assignee General Electric Company

[54] RECORDER CONTROL DEVICE FOR HOTBOX DETECTOR SYSTEM
20 Claims, 8 Drawing Figs.

[52] U.S. Cl. 340/206, 246/169 A, 340/203, 340/231, 340/227
[51] Int. Cl. G08c 19/16
[50] Field of Search 328/58; 340/206, 189, 190, 227, 231; 246/169 A

[56] References Cited
UNITED STATES PATENTS
3,108,773 10/1963 Pelino 246/169
3,263,090 7/1966 Blocher 246/169

*Primary Examiner*—John W. Caldwell
*Assistant Examiner*—Robert J. Mooney
*Attorneys*—Michael Masnik, Joseph B. Forman, Frank L. Neuhauser and Oscar B. Waddell

ABSTRACT: A hotbox detector system for railway cars is disclosed wherein the heat signals from trackside hotbox detectors are fed to an encoder for transmission to a remote location on a two channel binary carrier system. The encoder also receives information as to when a train is passing the detector and if an alarm condition exists. This information is transmitted over the same two channel carrier system by means of special codes between the two channels. A decoder at the remote location receives the heat signals from the carrier and passes them to a recorder. The decoder continuously monitors the levels of the two channels for the code indicating the presence or absence of a passing train and either turns the recorder on or off accordingly. Similarly, if the alarm code is detected, the decoder actuates an alarm at the remote location. The integrity of the system is assured since transmission is continuous.

INVENTOR
PAUL W. CAULIER
BY Michael Masnik
HIS ATTORNEY

PATENTED JUL 20 1971

3,594,744

INVENTOR
PAUL W. CAULIER
BY *Michael Masnik*
HIS ATTORNEY

INVENTOR
PAUL W. CAULIER
BY Michael Masnik
HIS ATTORNEY

INVENTOR
PAUL W. CAULIER
BY Michael Masnik
HIS ATTORNEY

RECORDER CONTROL DEVICE FOR HOTBOX DETECTOR SYSTEM

BACKGROUND OF THE INVENTION

1. Field of the Invention

This invention relates to event recording, and controls therefor, for use in hotbox detection systems for railroad cars. In particular, the invention relates to remote turn-on and turnoff of event recorders as a train passes a detection area. Also, the invention relates to the transmission of additional information over one pair of event signalling channels and to the transmission of alarm signals for improved reliability of the total transmitted information.

2. Description of the Prior Art

The presence of overheated journals or hotboxes as they are called, have presented problems to railroad operators for a number of years. Numerous methods have been devised and tried in an effort to detect the presence of a hotbox before the condition becomes so serious that a great loss in life or property results from a derailment of the train. These prior art approaches have suffered from various shortcomings.

SUMMARY OF THE INVENTION

In general, a typical hotbox detector comprises two heat scanners, one for each trainside, and one rail mounted wheel pickup which senses the passage of the train's wheels and controls all gating functions of the detector. The hotbox detector has two outputs or channels each containing information in the form of a rectangular pulse of a fixed duration but having an amplitude that varies as a function of the heat radiated by the journal box and detected by the radiation detector. The pulses on each channel are simultaneous; however, each carries different information in the form of the amplitude variations which reflect the temperature condition of the journal box that passes a particular scanner.

The amplitude of the heat signal on each channel varies in proportion to the amount of radiant energy given off by the journal box. A low amplitude signal (approximately 0.5 volts) is indicative of a cold bearing, whereas, a high signal amplitude (12 volts) is indicative of a hot bearing. The amplitude modulated heat signals on each channel in a particular embodiment have a constant width of 13 milliseconds.

These amplitude modulated heat signals are to be recorded by a recorder located a considerable distance from the detection site. In order to transmit these signals to the recorder undistorted by interference such as lightning, etc., the signals are modified, as will be described in detail, and then transmitted over a standard two channel on-off type discrete (binary) carrier. Each channel of the carrier operates between two levels with the only variable being one of the length of time the signal stays at a particular level, i.e., the width of the pulse transmitted is varied or modulated. A carrier transmitter for each channel is employed at the detector location to receive the modified output signals and transmit them over the carrier transmission lines to the recorder location where they are reverted back to their amplitude modulated form for recording and/or utilization.

A pulse width or duration modulation encoder is used to convert the amplitude modulated pulses from the detector into duration (time) modulated pulses to control the carrier transmitter. The encoder receives the amplitude modulated pulses from the detector, which have a constant width of 13 milliseconds, and converts them into pulses whose amplitude is either "0" or "1" but which have a fixed minimum width or duration of some base time period plus an incremental time period for every unit of heat signal defined by the input pulse.

A carrier receiver for each channel is connected to the carrier transmission lines at the recorder location. The carrier receiver duplicates the two signals produced by the encoder. The output of the carrier receiver is fed into a decoder which converts the duration modulated signals back into amplitude modulated signals. These amplitude modulated signals are in turn fed to a recorder where a permanent record is made of the signals on both channels. In other words, the input signal to the recorder is the same as the output signal of the hotbox detector.

Inasmuch as it is desirable that the recorder run only during train passage, it is necessary to turn the recorder on at the approach of the train and then turn it off as soon as the last set of wheels has passed the scanners. In a known prior art arrangement, one or both transmission channels (one for each hotbox detector channel) are deenergized in steady state. The channels were turned on by the hotbox detector whenever and as long as the train was passing. The carrier receivers were always energized. The present invention leaves both channels energized but at predetermined different levels. With both carrier transmitters and receivers continually energized, failure of either transmitter or either receiver can be detected immediately. Also, the effect of noise signals on the transmission line is less felt if the transmitter signal is received all the time. Noise signals which exceed a squelch limit could start the recorder in a system which deenergizes the transmitter. The same noise signal has less influence on a system when a carrier signal is present. One channel designated the A channel, for example, is left on the "0" level while the other channel B, is switched by the encoder to the "1" level whenever no train is present.

A separate recorder-detector, which is the subject of another feature of the present invention, monitors both channels of the carrier receiver output for any change in the state of the output level of the carrier receiver.

More specifically, the recorder-detector is part of the decoder and is designed to turn the recorder off or maintain the recorder in the off condition if channels A and B are continuously at opposite levels, for example, channel A is continuously left at the "0" level and channel B is continuously left at the "1" level. This condition would exist, as was previously stated, when no train was passing the detector.

However, if a train approaches the detection area, the wheel pickup senses the presence of the train and the hotbox detector switches channel B of the encoder to the "0" level. With both channels A and B at the "0" level, the recorder is turned on after a time delay. The time delay suppresses recorder response to transient signals on the carrier transmission lines.

After the train passes the detection site, channel A returns to the "0" state and remains there while channel B is again switched by the encoder to level "1" because of the lack of any input to the hotbox detector from the wheel pickup.

The basic condition of channel A being at a particular level for a period of time and channel B switching to a level opposite that of channel A is again present and the recorder-detector will switch the recorder off thus completing one recording cycle.

While the two channels are in the same state, pulses representing passage of successive wheels are transmitted over both channels to be recorded at the remote recorder location. If an alarm condition is detected, the encoder removes a portion of the leading edge of the output of one channel. The decoder detects this removed or notched portion in the leading edge of that channel's pulse and provides a wheel identifying alarm signal. The decoder also adds the missing portion to the pulse so that upon being reverted to amplitude modulated pulses accurate temperature information is maintained. The notching is performed on the wheel passage pulses. To improve the reliability of this method of alarming, if a hotbox is detected as being associated with a particular wheel passage, all successive wheel passage signals are notched for the remaining duration of train passage. This eliminates the possibility of treating a noise or other spurious signal as a discrete notched signal representing detection of a hotbox.

DESCRIPTION OF THE PREFERRED EMBODIMENT

Figure 1:
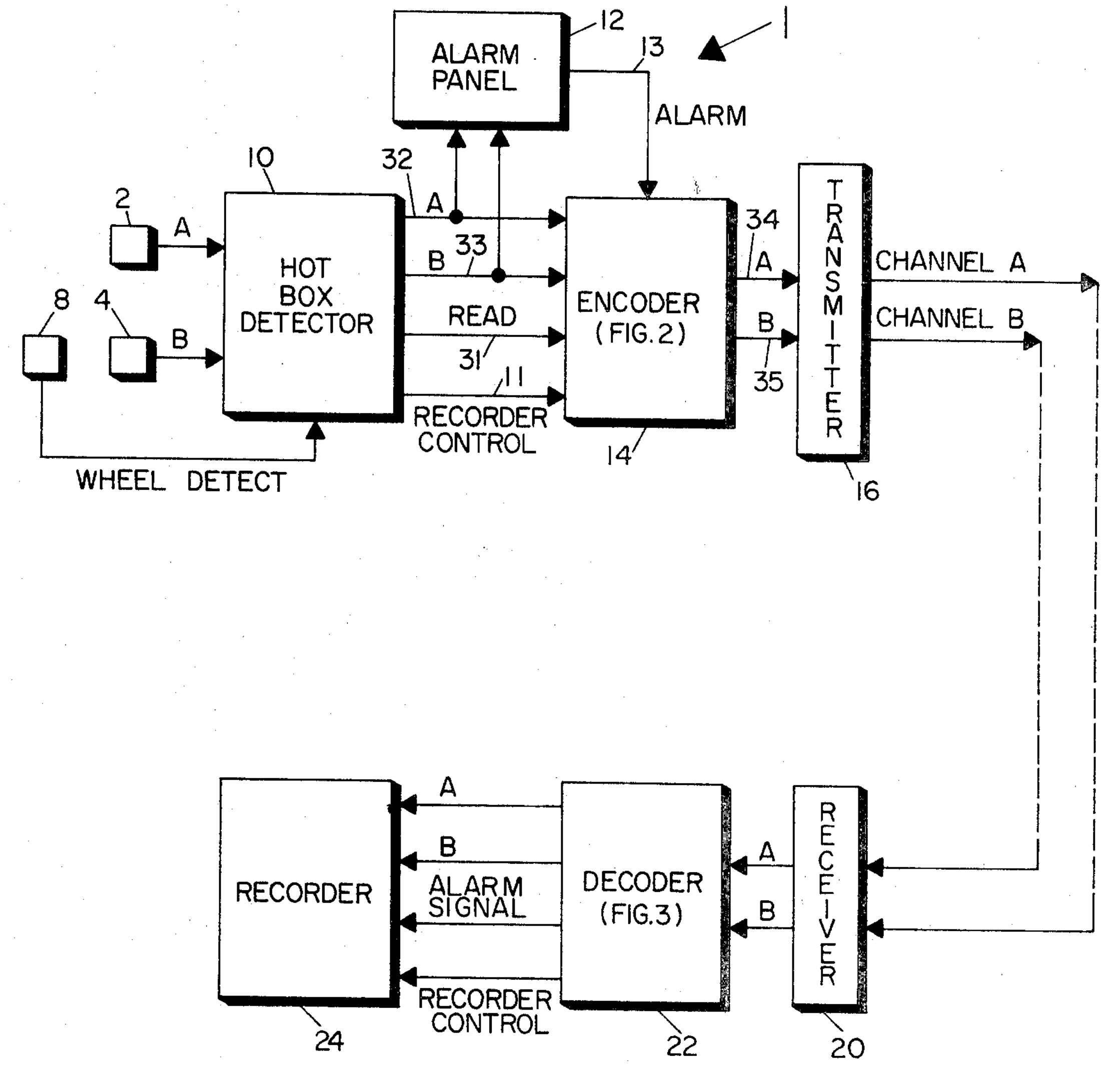
FIG. 1 is a block diagram of a hotbox detector system employing the recorder-detector in accordance with the present invention.

Referring now specifically to FIG. 1, a railroad car hotbox detector system is shown generally at 1. Heat scanners 2, 4 are mounted on each side of a railroad track and are positioned to look at the upper side of the journal box (not shown) of a passing railroad car. The outputs of scanners 2, 4 are fed into a hotbox detector 10 in the form of pips. Each pip represents the passage of one wheel per side of the passing train. The amplitude of the pip is proportional to the amount of radiant energy sensed by the scanners 2, 4.

The hotbox detector 10 converts the pips from scanners 2, 4 into two simultaneous rectangular heat signals in the form of pulses, the amplitude of which is proportional to the amount of radiant energy sensed by the scanners 2, 4. A cold journal will be represented by a pulse whose amplitude is approximately 0.5 volt, whereas, a warm or hot journal will be represented by a pulse whose amplitude is no greater than 12 volts. The width of the pulses from the hotbox detector is 13 milliseconds in the specific example described herein.

Figures 5, 6:
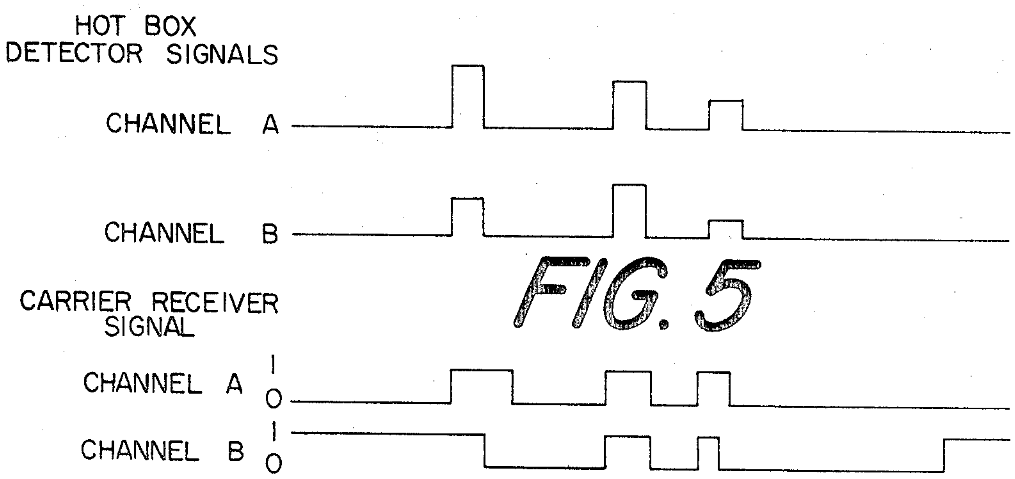
FIG. 5 shows a series of amplitude modulated pulses on channels A and B as they appear at the output of the hotbox detector.
FIG. 6 shows a series of corresponding time modulated pulses on channels A and B as they appear at the output of the carrier receiver.

FIG. 5 shows graphically the amplitude modulated signals from the hotbox detector 10 as they may appear on channels A and B. In addition to producing the simultaneous amplitude modulated heat signals on two channels A and B, the hotbox detector 10 also provides two control signals, read and recorder control signals to be described.

The hotbox detector 10 will produce these control signals upon command of the wheel pickup 8. The wheel detector pickup 8 provides a separate signal to the hotbox detector 10 during the entire passage of the train for each wheel passage. In response to the signal from inputs wheel pickup 8, the hotbox detector 10 produces a "Recorder Control" signal (FIG. 7) on line 11 which occurs when a train is first detected and remains on as long as the train is passing. The detector 10 also provides over line 31 to encoder 14 a "Read" signal for each wheel going past the pickup 8. This "Read" signal has a fixed amplitude and width. The two heat signals on channels A and B, the "Read" signal and the "Recorder Control" signal thus comprise four of the five inputs to encoder 14.

Encoder 14 responds to the signal on line 31 to convert the amplitude modulated heat signals on lines 32 and 33 (shown at FIG. 5) into width or duration modulated pulses as shown in FIG. 6. The duration of these pulses is directly proportional to the amplitudes of the pulses on lines 32 and 33. Thus, the duration of the pulses produced by encoder 14 is proportional to the hotness of a journal as detected by detector 10, except a minimum or base duration.

As previously indicated, when no train is passing the detection site, no signals are available over lines 11 and 31 and the encoder 14 develops a signal on line 34 at one level, such as a "0," and a signal on line 35 at a different level, such as a "1." As will be explained more fully hereafter, this condition of the two channels indicates that no train is passing. In response to signals on line 11 from hotbox detector 10, encoder 14 develops the one level, that is a "0," on line 35. The "0" level on both of lines 34 and 35 and is transmitted by transmitter 16 to receiver 20 and thence to decoder 22. Decoder 22 responds to this condition to turn recorder 24 on. When the signal on line 35 is once again at the "1" level indicating that the train has passed, decoder 22 responds thereto to turn off recorder 24. The turn-on and turnoff signals are shown as Recorder Control signals applied from 22 to 24.

The A and B channels of transmitter 16 receive the duration modulated pulses from encoder 14 over lines 34 and 35. The channels of transmitter 16 may be adapted to switch levels in and out of the level "1" region in response to the leading and lagging edges of the duration modulated pulses. Where transmitter 16 constitutes a frequency-shift carrier system, the output of transmitter 16 comprises carrier frequency shift pulses whose width is proportional to the amplitude of pulses from hotbox detector 10 and hence proportional to the temperature rise of the journals being detected. In its simplest form, the carrier modulation channels of transmitter 16 may each be a bistable circuit which switches between "0" and "1" levels in a well-known manner.

Channels A and B from the hotbox detector 10 are also fed to an alarm panel 12. A differential sensor amplifier in the alarm panel 12 checks the amplitude of the heat signals on channels A and B and produces an alarm signal whenever such heat signals indicate an overheated journal. This alarm signal is fed to the encoder 14 which removes a 2-millisecond notch from the pulses to be made available on line 35 of channel B. This 2-millisecond notch of the pulses on channel B is detected by the decoder 22 and an event marker is actuated in recorder 24 in order to draw attention to the fact that an overheated journal has been detected and its wheel location on the train.

Figure 2:
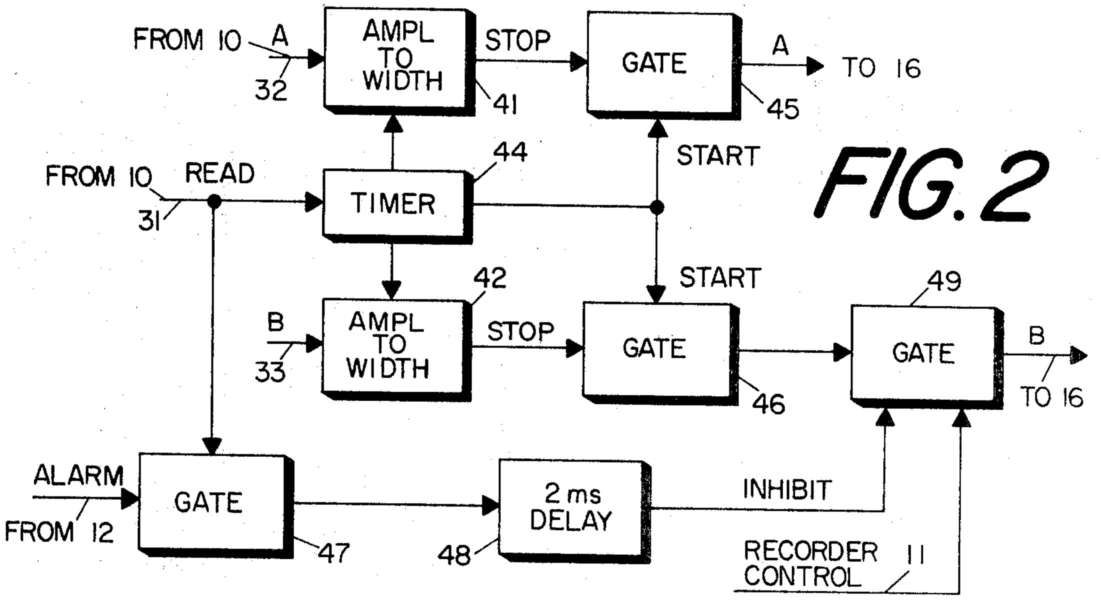
FIG. 2 is a block diagram of the encoder used in the system of FIG. 1.

The encoder 14 is shown in FIG. 2 as comprising amplitude to width modulators 41 and 42 connected to lines 32 and 33, respectively. These may be of any well-known type and may comprise, for example, a sample and hold circuit, an integrator and a voltage comparator. The sample and hold circuit would store the amplitude of the pulse to be converted to a width modulated pulse. The integrator would commence integrating at a predetermined rate at the beginning of the sampled pulse. When the output of the integrator equaled the stored voltage in the sample and hold circuit, the comparator would provide an output which marked the end of the width modulated pulse.

Timer 44 controls the operation of the encoder 14 by synchronizing the operation of modulators 41 and 42 with the "read" pulse on line 31. Timer 44 at the beginning of each pulse opens gates 45 and 46 which provide a "1" level signal at their outputs. Gates 45 and 46 are closed by the outputs of modulators 41 and 42, respectively, as when, for example, the previously mentioned voltage comparators produce an output pulse.

Gates 45 and 46 may take any suitable form but may, for example, be bistable multivibrators. As such, they would operate to switch to their "1" state upon receipt of a pulse from timer 44, and their "0" state upon receipt of a pulse from their respective modulator 41 or 42.

The "Read" signal on line 31 is also coupled to one input of gate 47. The alarm signal from alarm panel 12 is connected to the other input of gate 47. The output of gate 47 triggers a 2-millisecond delay timer 48 which may, for example, be a one-shot multivibrator. Delay timer 48 is connected to an inhibit input to gate 49. Gate 49 is coupled to the output of gate 46; hence, an output from delay timer 48 prevents the channel B pulse from being transmitted for the first 2 millisecond, of its duration.

Gate 49 also receives the "Recorder Control" signal on line 11. When there is no signal on line 11, the output of gate 49 is continuously at the "1" level. Upon detecting a train through wheel pickup 8, a hotbox detector 10 provides a signal on line 11. The output of gate 49 then drops to the "0" level and thereafter transmits the output of gate 46.

Figure 7:
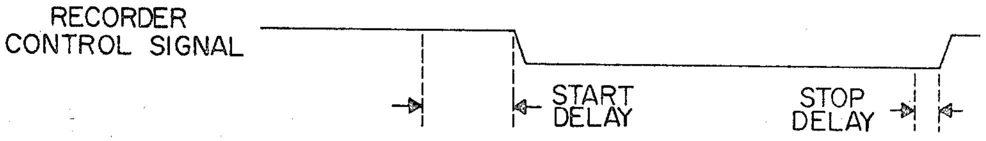
FIG. 7 shows a recorder control signal as it appears at the output of the decoder before, during and after train passage.
Figure 8:
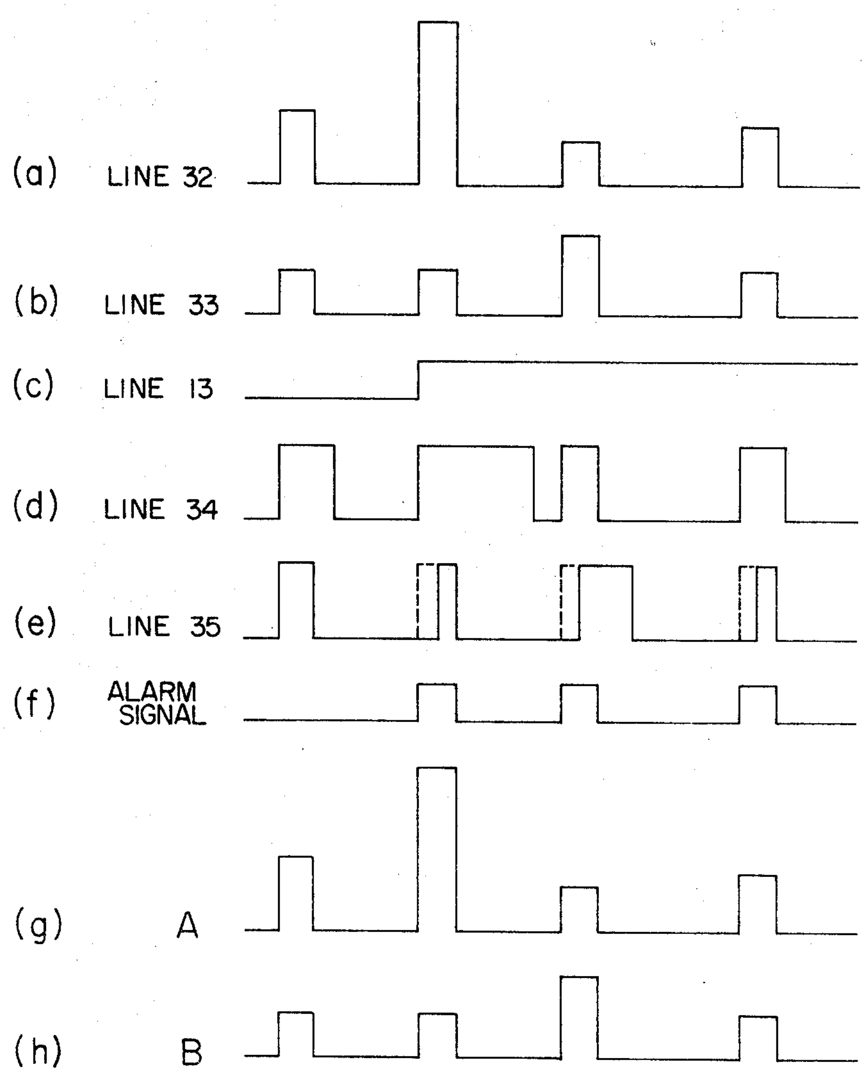
FIGS. 8*a*—8*h* show how the alarm signal is superimposed on the pulse duration modulation signals.

For the heat signals from the hotbox detector shown in FIGS. 8*a* and 8*b*, the transmitter 16 produces the two channel waveforms shown in FIGS. 8*d* and 8*e*. The waveforms in FIG. 8 are referred to as the carrier receiver signal because these signals are reproduced at the output of carrier receiver 20 of FIG. 1. The "Recorder Control" signal is illustrated in FIG. 7. The initial switching of channel B from the "1" to the zero state starts the "Recorder Control" signal after a start delay, and the final switching of channel B back to the "1" state initiates the trailing edge of the "Recorder Control" signal after a stop delay. Thus the two transmitted channels carry four sets of information. Channel A carries the heat information from scanner 2; channel B carries the heat information from scanner 4; and the combination of channel A and B waveforms carries the information about the beginning and end of train passage and an alarm condition.

Figure 3:
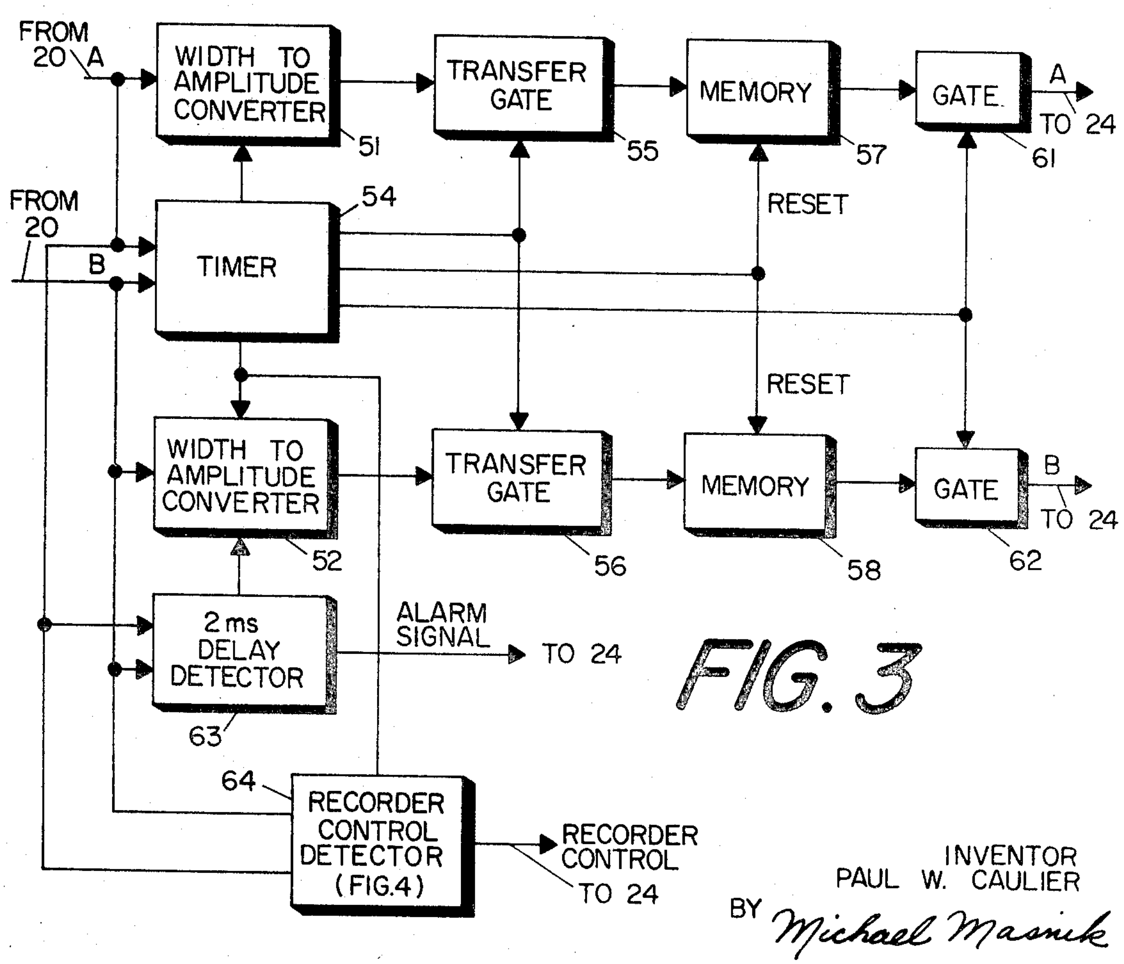
FIG. 3 is a block diagram of the decoder used in the system of FIG. 1.

The output of the carrier transmitter, namely channels A and B, is then fed via carrier transmission lines 18 to a continuously operating carrier receiver 20 at the recorder location. The output of the carrier receiver 20, as shown graphically in FIG. 3, is then fed to a decoder 22 which converts the duration modulated pulses to amplitude modulated pulses which are then sent to a recorder 24 in a manner well known in the art. The input pulses to the recorder 24, see FIGS. 8*g* and 8*h*, are identical to the output pulses of the hotbox detector 10, shown at FIGS. 8*a* and 8*b*.

The decoder 22 is shown in more detail in FIG. 3 and includes width to amplitude converters 51 and 52 which receive the signals on channel A and B (FIGS. 8*d* and 8*e*), respectively. Converters 51 and 52 may be, for example, integrators which integrate at a preset rate for the duration of the incoming pulse. The output of the integrators would thus be a voltage level having an amplitude proportional to the duration of the pulse.

Timer 54 receives pulses from both the A and B channels and produces pulses which initiate the cycles of converters 51 and 52. After a pair of pulses are converted to a voltage level but before the next pair of pulses arrive, timer 54 causes transfer gates 55 and 56 to sample the outputs of converters 51 and 52, respectively. The sampled outputs are temporarily stored in memory units 57 and 58, thereby permitting converters 51 and 52 to accept the next pair of pulses. Timer 54 then produces a gating pulse of fixed duration which is applied to one input of gates 61 and 62. The other input to gates 61 and 62 is connected to memory units 57 and 58, respectively. The outputs of these last two gates are applied to the recorder 24.

The decoder 22 also includes a 2-millisecond detector circuit 63. Circuit 63 receives the channel A and B inputs (FIGS. 8*d* and 8*e*) from receiver 20. When the 2-millisecond delay condition is detected, detector 63 adds the missing portion of the B channel pulse in converter 52. In addition, detector 63 provides an alarm signal (see FIG. 8*f*) to the recorder 24.

"Recorder Control" detector 64 continuously monitors channels A and B and turns the recorder 24 on shortly after a train reaches the detection site and keeps it on during the transmission of normal heat signal pulses. The recorder detector 64 then turns the recorder 24 off shortly after the train passes the detection site. The recorder 24 is controlled by means of a recorder control signal as shown in FIG. 7 which is generated by the recorder detector 64 in response to the third item of information referred to above. The recorder detector circuit 64 is shown schematically in FIG. 4.

Figure 4:
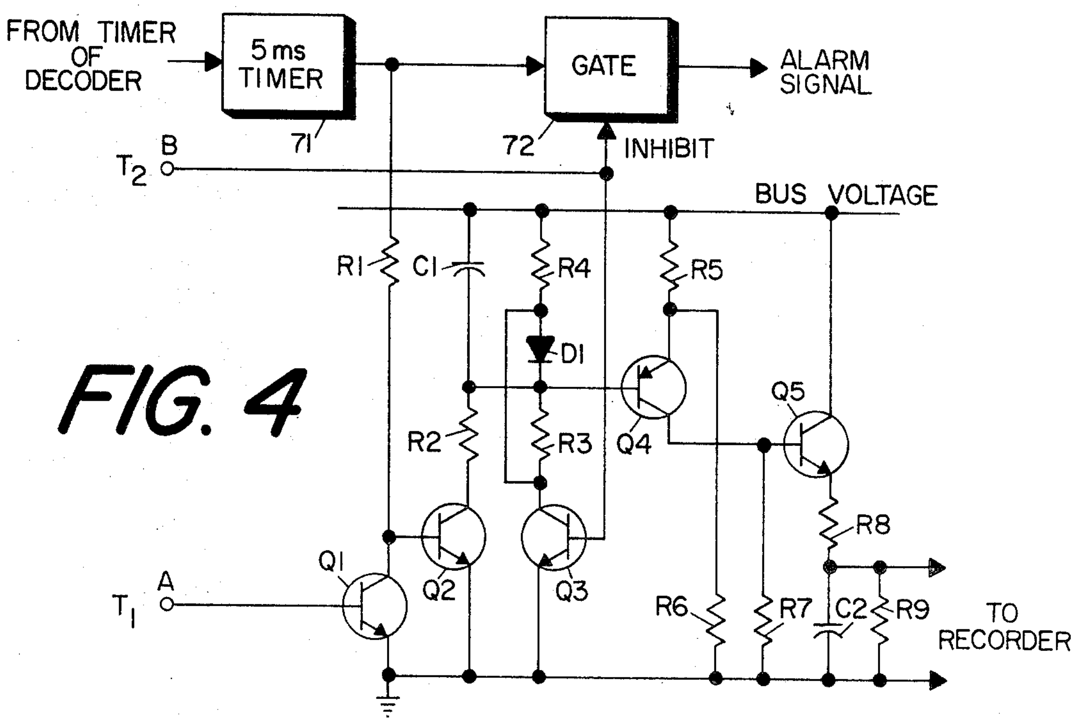
FIG. 4 is a schematic circuit diagram of preferred embodiment of the recorder control circuit used in the decoder shown in FIG. 3.

The recorder-detector shown in detail in FIG. 4 provides an output which is at one voltage level when no train is passing and is at a second voltage level when a train is passing. The output is connected to the recorder 24 and gates the recorder on when it is at the second voltage level. The output signal, referred to as the recorder control signal, is illustrated generally in FIG. 7. Comparing FIGS. 6 and 7 it can be seen that when channels A and B are at the levels "0" and "1" the recorder control signal will be at a first voltage level indicating the absence of a train. When channel B switches to the "0" level, and channel A remains at the "0" level, the recorder control signal output will switch to a second level voltage. It will be noted that the recorder control signal will not switch to the second level voltage until a prefixed "start delay" time after channel B first switches to the "0" level. The purpose of the "start delay" is to prevent the recorder control signal from switching in response to noise signals. The recorder control signal will remain at the second level, indicating that a train is passing, until such time as channel B switches to the "1" level with channel A being at the "0" level. The recorder control signal switches back to the first level a short predetermined delay time after the latter described condition occurs. The delay time is referred to as the stop delay. The purpose of the stop delay is to prevent the recorder control signal from switching back to the first level in response to the time duration pulses during the passage of the train. An example will explain why the stop delay is necessary.

Assume that during the passage of the train a time duration pulse on channel A is short compared with the corresponding time duration pulse on channel B. This will occur if scanner 2 senses a hotter journal than that sensed by scanner 4 (FIG. 1). When the aforesaid time duration signal on channel A terminates, that channel will switch to the "0" level but channel B will still be at the "1" level. The condition of channel A at "0" and channel B at "1" is the same condition which indicates that no train is passing. Thus, the stop delay is necessary to prevent the recorder control signal from switching back to the first level unless the proper condition (channel A at "0" and channel B at "1") remains for a predetermined length of time. The predetermined "stop delay" is longer than that which would occur in response to two time duration pulses being at opposite levels.

For the specific circuit shown in FIG. 4, the first level of the recorder control signal is a positive voltage and the second level for the recorder control signal is substantially 0 voltage. This signal may then be applied to an inverter for applying a positive voltage gate to the recorder to turn said recorder on.

The recorder detector of FIG. 4 receives the channel A and channel B waveforms at the terminals $T_1$ and $T_2$ respectively. The recorder control signal appears at the output across the capacitor $C_2$. In the initial state where the train is not passing, and where the channel A waveform is at the "0" level and channel B is at the "1" level, the following occurs. Transistor $Q_3$ will be turned on and capacitor $C_1$ will be fully charged. Due to the on condition of transistor $Q_3$, the diode $D_1$ will be reverse biased thereby holding the charge on capacitor $C_1$. The fully charged capacitor $C_1$ turns on transistors $Q_4$ and $Q_5$ thereby providing a positive voltage across the output capacitor $C_2$. When channel B initially switches to the "0" state, thereby indicating the front end of the train is passing, transistor $Q_3$ is turned off thereby removing the reverse bias from diode $D_1$. Capacitor $C_1$ discharges through resistor $R_4$ and diode $D_1$. After the charge on a capacitor is reduced to a value which will turn off transistor $Q_4$, the transistor $Q_4$ as well as transistor $Q_5$ turns off. When transistor $Q_5$ turns off, the charge on capacitor $C_2$ is discharged through resistor $R_9$ thereby placing the output voltage at the second level, i.e., recorder on condition. The time constant of $R_9$, $C_2$ determines the "start delay" referred to above. It will be noted, for example, that if a noise signal caused channel B to switch to the 0 state for a short period of time, the charge on capacitor $C_2$ will not have been sufficiently reduced to turn off transistor $Q_4$.

When the train has completely passed the sensing location, channel B, as described above, will revert back to the "1" state, thereby turning on transistor $Q_3$, charging capacitor $C_1$ through $R_3$, turning on transistors $Q_4$ and $Q_5$, and charging capacitor $C_2$ through $R_8$. The time constant $R_3$, $C_1$ is set to control the "stop delay" referred to above. The operation of the circuit of FIG. 4, insofar as it turns on the recorder when a train is passing, has now been described. However, an important feature of this circuit is its insensitivity to the time duration signals which occur on channels A and B during the time that the train is passing. Thus, the circuit must be adapted so that it will not change output states in response to any condition of the time duration pulses. This so-called insensitivity will be described below.

Assume that the front end of the train has passed so that presently channels A and B are in the "0" state and transistors $Q_3$ and $Q_2$ are turned off. Capacitor $C_1$ will be fully discharged. When a pair of duration modulated pulses occur, both channels A and B will switch to the "1" level. The "1" level signal at terminal $T_2$ turns on transistor $Q_3$ which starts the charging of capacitor $C_1$ through $R_3$. However, the time constant of $C_1$, $R_3$ is sufficiently large so that during the presence of the longest time duration pulse, capacitor $C_1$ will not be sufficiently charged to turn on transistor $Q_4$. A pulse on either channel A or B causes the timer 54 (FIG. 3) to produce a pulse which triggers a 5-millisecond one shot circuit 71. The 5-millisecond output pulse of the one shot circuit operates to turn on transistor $Q_2$ provided it is not shorted to ground by transistor $Q_1$. Assuming, in the first instance, that transistor $Q_1$ does not short the 5-millisecond pulse to ground, transistor $Q_2$ will turn on for 5-milliseconds thereby charging capacitor $C_1$ through resistor $R_2$. The time constant of $R_2$, $C_1$ is sufficiently low so that capacitor $C_1$ will fully charge during the 5-millisecond period. However, the "1" level of channel A is also applied to the base of transistor $Q_1$ to turn that transistor on thereby preventing $Q_2$ from being turned on. Consequently, when "1" level signals appear at both terminals $T_1$ and $T_2$, the capacitor $C_1$ will not be charged sufficiently to change the state of the output of the recorder detector circuit. However, if channel B alone goes to the "1" level, which occurs when a train has passed completely, the one shot circuit $T_1$ will be triggered but transistor $Q_1$ will not short the 5-millisecond pulse to ground. Consequently, transistor $Q_2$ will turn on, thereby rapidly charging $C_1$ which in turn operates to turn on transistors $Q_4$ and $Q_5$ and change the level of the output signal.

The output pulse from one-shot 71 is also connected to a gate 72. Gate 72 is inhibited by a "1" level signal on the B channel. When there is an alarm condition, timer 54 will trigger one-shot 71 upon receipt of a pulse on the A channel; but since the B channel pulse is inhibited for the first 2 milliseconds, gate 72 will pass the output of one-shot 71 during this time interval. The resulting output of gate 72 is connected to the "Event Record" input of recorder 24. Thus, the recorder 24 produces a record which identifies where the alarm condition exists.

As can be seen, the recorder-detector circuit as herein disclosed provides a means for controlling a remote recorder without the need for a separate turn-on and turnoff channel from the transmitter.

What I claim as new and desire to be secured by Letters Patent of the United States is:

1. A hotbox detector system for railway cars comprising
  - a. detector means for generating simultaneously occurring first and second pulses having a fixed duration but whose amplitudes vary as a function of detected radiant energy,
  - b. encoding means for converting said first and second amplitude varying pulses to width modulated pulses having a fixed amplitude, said width modulated pulses having durations proportional to the amplitudes of their respective amplitude varying pulses, said encoding means further generating a pair of bilevel signals which are at opposite levels in the normal state,
  - c. means responsive to the passage of a train past said detector means for causing one of said bilevel signals to switch to the other level and thereafter allowing said width modulated pulses to pass,
  - d. transmission means for transmitting the outputs of said encoding means to a remote location,
  - e. decoding means responsive to the transmitted outputs of said encoding means for converting said width modulated pulses into amplitude varying pulses of fixed duration, said decoding means further including monitoring means for continuously monitoring said pair of bilevel signals to produce an output control voltage a first predetermined time after said one of said bilevel signals switches to said other level and to terminate said output voltage a second predetermined time after said bilevel signals resume their normal state, and
  - f. recorder means controlled by said output voltage for recording said amplitude varying pulses produced by said decoding means.

2. The apparatus as claimed in claim 1 wherein said monitoring means comprises,
  - a. a first terminal connected to receive the first of said bilevel signals,
  - b. a second terminal connected to receive the second of said bilevel signals,
  - c. output switching means, having two switching states, for generating said control voltage only when in a first state of said two switching states,
  - d. chargeable storage means connected to said output switching means for switching said switching means to said first state when the charge on said storage means is at a first preestablished value and for switching said switching means to a second state when the charge on said storage means is at a second preestablished value, and
  - e. means connected to said input terminals responsive to said bilevel signals at said first and second terminals for charging said chargeable storage means to said first value when said pair of signals are at said normal state opposite levels for said first predetermined period of time, and for discharging said chargeable storage means to said second value when said pair of bilevel signals are at the same level for said second predetermined period of time.

3. The apparatus as claimed in claim 2 wherein said bilevels are "0" and "138 levels, said normal state opposite levels are "0" level for said first bilevel signal and "1" level for said second bilevel signal, and said means for charging and discharging comprises,
  - a. a first charging circuit means connected to said second terminal and said chargeable storage means for charging said chargeable storage means at a first time constant in response to said second bilevel signal being at the "1" level,
  - b. a second charging circuit means connected to said first and second terminals and said chargeable storage means for charging said chargeable storage means at a second time constant in response to said second bilevel signal going to said "1" level when said first bilevel signal is at said "0" level, said second time constant being shorter than said first time constant, and
  - c. discharging circuit means connected to said chargeable storage means and said first charging circuit for discharging said chargeable storage means when said first charging circuit means is not charging said chargeable storage means.

4. The apparatus as claimed in claim 3 wherein said chargeable storage means is a storage capacitor.

5. The apparatus as claimed in claim 4 wherein said first charging circuit means comprises,
  - a transistor and resistor combination in series with said capacitor, the base of said transistor being connected to said second terminal for turning on said transistor when said second bilevel signal is at the "1" level.

6. The apparatus as claimed in claim 1 further comprising
  - a. alarm means responsive to the outputs of said detector means for inhibiting one of said width modulated pulses for a fixed period of time if one of the said outputs of said detector means exceeds a predetermined amplitude level, and
  - b. said monitoring means further comprising a means responsive to the inhibiting of said one of said width modulated pulses for providing an output indication.

7. The apparatus as claimed in claim 6 wherein said output indication from said decoding means is recorded by said recorder means.

8. The apparatus as claimed in claim 6 wherein said output indication is an alarm.

9. Apparatus for turning on and off a recorder in response to the passage of a train past a hotbox detector means positioned at trackside, the apparatus comprising:

a. controllable signal generating means for generating a pair of bilevel signals which are at given relative levels in the normal state, b. means responsive to the passage of a train past said hotbox detector for controlling said signal generating means to change the given relative levels of said bilevel signals, c. means for modulating said changed bilevel signals in accordance with the intensity of the radiant heat detected by said hotbox detector, d. a recorder, and e. recorder detector means having said pair of bilevel signals applied to a pair of inputs thereto and an output connected to said recorder for initiating a turn-on output voltage in response to said bilevel signals being at said changed levels for a first predetermined period of time and for terminating said turn-on output voltage in response to said bilevel signals being at said given levels for a second predetermined amount of time.

10, In combination first means for providing simultaneously occurring first and second signals having a fixed duration but whose amplitude varies from a given level as a function of the departures of an operating characteristic of two respective events from a given level, second means for converting said first and second amplitude varied signals into respective third and forth signals having a fixed amplitude but whose width varies from a given base width as a function of the amplitude variation of said first and second signals from said base level, third means for communicating said third and fourth signals, fourth means responsive to said communicated third and fourth signals for converting the width variation thereof into amplitude variation fifth and sixth signals, a utilization means responsive to the amplitude of said fifth and sixth signals fifth means responsive to at least one of said first or second signals exceeding a given amplitude level for removing a portion of the leading edge of one of said third and fourth signals by an amount less than said given width, said fourth means nonresponsive to the removal of a portion of the leading edge of said communicated third or fourth signals to effect said conversion of said width variation into amplitude variation fifth and sixth signals, and sixth means responsive to removed portion of the leading edge of said communicated third or fourth signal for providing an indication.

11. An arrangement according to claim 10 wherein said departures of operating characteristic occur recurrently over a given time interval, seventh means for recurrently measuring said departures over said given time interval, said first means responsive to said measured departures for providing said first and second signals, and eighth means responsive to the initiation of said measurements to render said utilization means operative to respond to signals only for the duration of said measurement.

12. An arrangement according to claim 11 comprising ninth means responsive to the time of occurrence of each measurement for initiating the leading edge of said third and fourth signals.

13. In combination first means for providing recurrent first and second signals having a first characteristic varying from a reference level as a function of the departures of an operating characteristic of two respective events during a given recording period, second means for converting said first and second signals into respective recurrent third and fourth signals having a second characteristic varying from a reference level as a function of the variance of said first characteristic of said first and second signals, third means for communicating said third and fourth signals, fourth means responsive to said communicated third and fourth signals for converting the second characteristic variation thereof into first characteristic varied fifth and sixth signals, a utilization means responsive to the first characteristic variations of said fifth and sixth signals, fifth means responsive to at least one of said first or second signals exceeding a given first characteristic level for removing a portion of said second characteristic of one of said third and fourth signals for all subsequent recurrences associated with said given recording period, said fourth means nonresponsive to the removed portion of said communicated third or fourth signals to effect the response of said utilization means to said fifth and sixth signals, sixth means responsive to the removed portion of said communicated third or fourth signals for providing an indication.

14. An arrangement according to claim 13 comprising seventh means for measuring said first characteristic departures over said given time interval, eighth means responsive to said measurements to cause said utilization means to respond to first characteristic variations only for the duration of said measurements.

15. An arrangement according to claim 14 wherein said eighth means comprises means delayed with respect to the initiation of and the termination of measurements during said recording period for initiating and terminating the responsiveness of said utilization means to first characteristic variations.

16. In combination first means responsive to the successive passage of pairs of wheels past a measurement station during a given time period for providing corresponding recurrent first and second pulses whose amplitude varies from a reference level as a function of the radiant heat of the journals associated with said wheels, second means for converting said first and second amplitude varied pulses into respective third and fourth pulses whose width varies from a given reference width as a function of the amplitude variation of said first and second pulses from said reference level, third means for communicating said third and fourth pulses, fourth means responsive to said communicated third and fourth pulses for converting the width variation thereof into amplitude variation fifth and sixth pulses, a recorder responsive to the amplitude of said fifth and sixth pulses to record the temperatures of said journals, fifth means responsive to at least one of said first or second pulses exceeding a given amplitude level indicating a hot journal for removing a portion of the leading edge of one of said third and fourth pulses by an amount less than said given width, said fourth means nonresponsive to the removal of a portion of the leading edge of said communicated third or fourth pulses to effect the recording of the temperature of said journals, sixth means responsive to the removed portion of the leading edge of said communicated third or fourth pulses for providing an indication of a hot journal.

17. An arrangement according to claim 16 wherein said fifth means removes a portion of the leading edge of one of said third and fourth signals for all subsequent recurrences thereof associated with said given time period.

18. An arrangement according to claim 16 wherein said recorder is normally inoperative to record, said third means communicating first and second carrier signals having a first and second state respectively, means for changing the states of said carrier signals in response to said successive passage of pairs of wheels, said recorder responsive to said first state of said carrier signals to become operative after a given time delay and responsive to said changed state of said carrier signals to become inoperative.

19. Apparatus for recording the radiant heat generated by the journals of a passing train comprising a source of a first and second control signal each capable of occurring at a first or a second logic level state, said control signals having a first pattern of logic states in the absence of a passing train, means responsive to the passage of a train to change the logic states of said first and second control signals to a second pattern of logic states for substantially the time period of said train passage, means responsive to the detection of radiant heat from the journals associated with one side of said train to produce first hotbox signals, means responsive to the detection of radiant heat from the journal, associated with the other side of said train to produce second hotbox signals, means responsive to first hotbox signals for changing the second pattern logic states of said first control signals to the opposite state for a time period which is a function of the intensity of the detected value of radiant heat represented by said first hotbox signals, means responsive to second hotbox signals for changing the second pattern logic states of said second control signals to the opposite state for a time period which is a function of the intensity of the detected radiant heat represented by the value of said second hotbox signals, a normally inoperative recorder, means responsive to said second pattern logic states of said first and second control signals for rendering the recorder operative for substantially the period of said train passage, said recorder responsive to said changed second pattern logic states of said first and second control signals upon being rendered operative for recording said first and second hotbox signals.

20. Apparatus for recording the heat associated with elements of a passing object comprising a source of a first and second control signal each capable of occurring at a first or a second logic level state, said control signals having a first pattern of logic states in the absence of a passing object, means responsive to the passage of an object to change the logic states of said first and second control signals to a second pattern of logic states for substantially the time period of said object passage, means responsive to the detection of heat associated with elements associated with one side of said object to produce first detection signals, means responsive to the detection of heat associated with elements associated with another side of said object to produce second detection signals, means responsive to first detection signals for changing the second pattern logic states of said first control signals to the opposite state for a time period which is a function of the intensity of the detected value of heat represented by said first detection signals, means responsive to second detection signals for changing the second pattern logic states of said second control signals to the opposite state for a time period which is a function of the intensity of the detected heat represented by the value of said second detection signals, a normally inoperative recorder, means responsive to said second pattern logic states of said first and second control signals for rendering the recorder operative for substantially the period of said object passage, said recorder responsive to said changed second pattern logic states of said first and second control signals upon being rendered operative for recording said first and second detection signals.